United States Patent
Tajima et al.

[11] Patent Number: 5,959,429
[45] Date of Patent: Sep. 28, 1999

[54] VARIABLE SPEED CONTROLLING DEVICE FOR INDUCTION MOTOR

[75] Inventors: Hirokazu Tajima; Hidetoshi Umida; Takashi Aihara, all of Tokyo, Japan

[73] Assignee: Fuji Electric Co., Ltd., Kawasaki, Japan

[21] Appl. No.: 09/022,864

[22] Filed: Feb. 12, 1998

[30] Foreign Application Priority Data

Feb. 14, 1997 [JP] Japan ................................. 9-030155

[51] Int. Cl.⁶ .......................... H02P 07/36; H02P 07/635
[52] U.S. Cl. .......................... 318/799; 318/804; 318/809; 318/811
[58] Field of Search .................. 318/767, 798–801, 318/804–811

[56] References Cited

U.S. PATENT DOCUMENTS

| | | | |
|---|---|---|---|
| 4,459,534 | 7/1984 | Nagase et al. | 318/808 |
| 4,469,997 | 9/1984 | Curtiss et al. | 318/729 |
| 5,334,923 | 8/1994 | Lorenz et al. | 318/805 |
| 5,341,081 | 8/1994 | Yamada | 318/800 |
| 5,365,158 | 11/1994 | Tanaka et al. | 318/806 |
| 5,459,386 | 10/1995 | Okachi et al. | 318/727 |
| 5,481,173 | 1/1996 | Yamamoto | 318/801 |
| 5,668,459 | 9/1997 | Kim | 318/798 |

*Primary Examiner*—Bentsu Ro
*Attorney, Agent, or Firm*—Greer, Burns & Crain, Ltd.

[57] ABSTRACT

When an induction motor is variable-speed-controlled via an electric power converting circuit, the magnetic flux of the induction motor is modulated by adding an alternating current signal to, for example, a magnetizing current command. For example, the component depending on the slip frequency of the induction motor is extracted by an extracting means from at least one of the amounts of changes of the voltage, the electric current, and the magnetic flux, which are caused by the modulation of the magnetic flux. The amount of the voltage or the electric current supplied to the motor, etc. is controlled based on the extracted component via an adjusting unit and a control means, thereby implementing superior control of the induction motor.

10 Claims, 16 Drawing Sheets

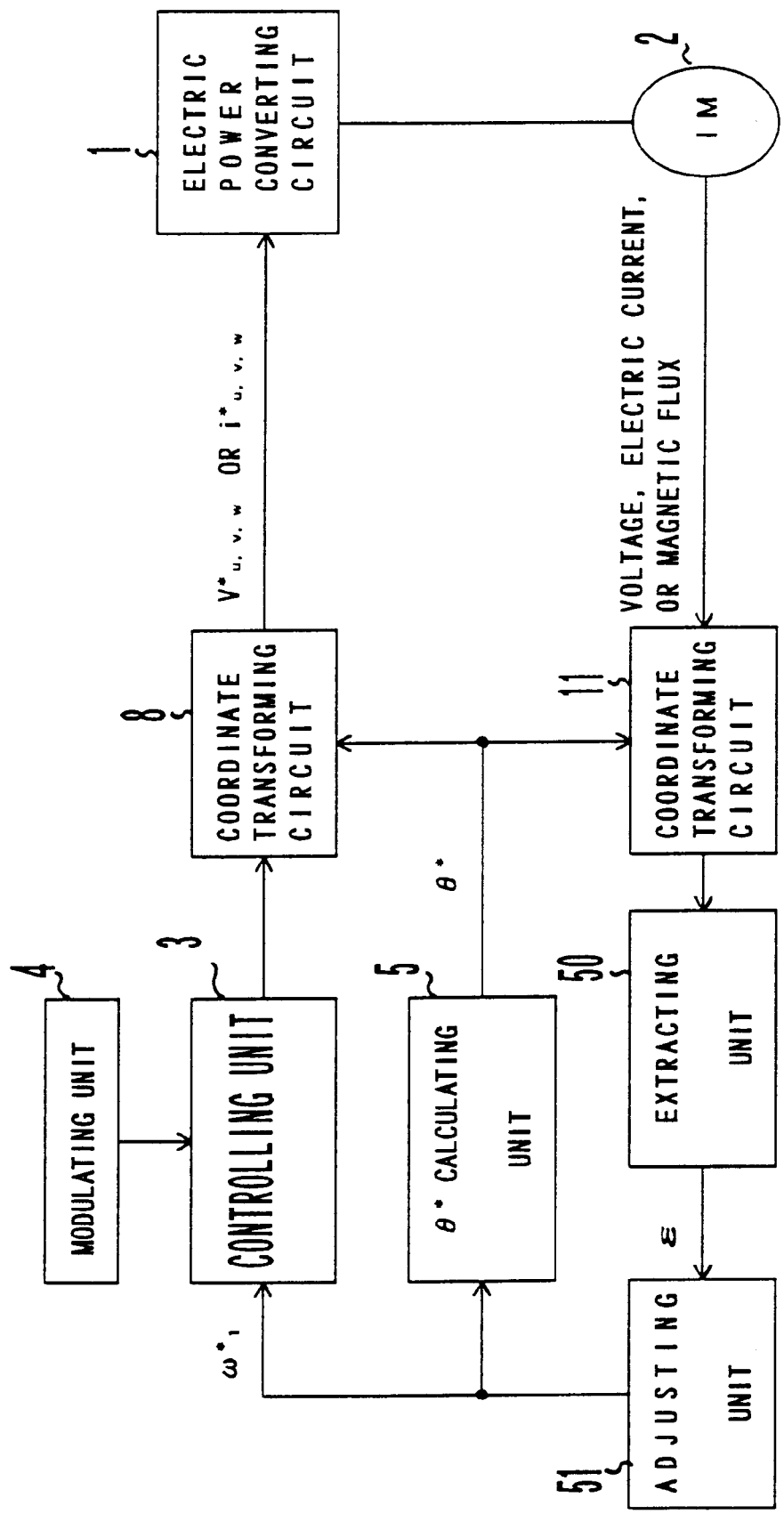
F I G. 5

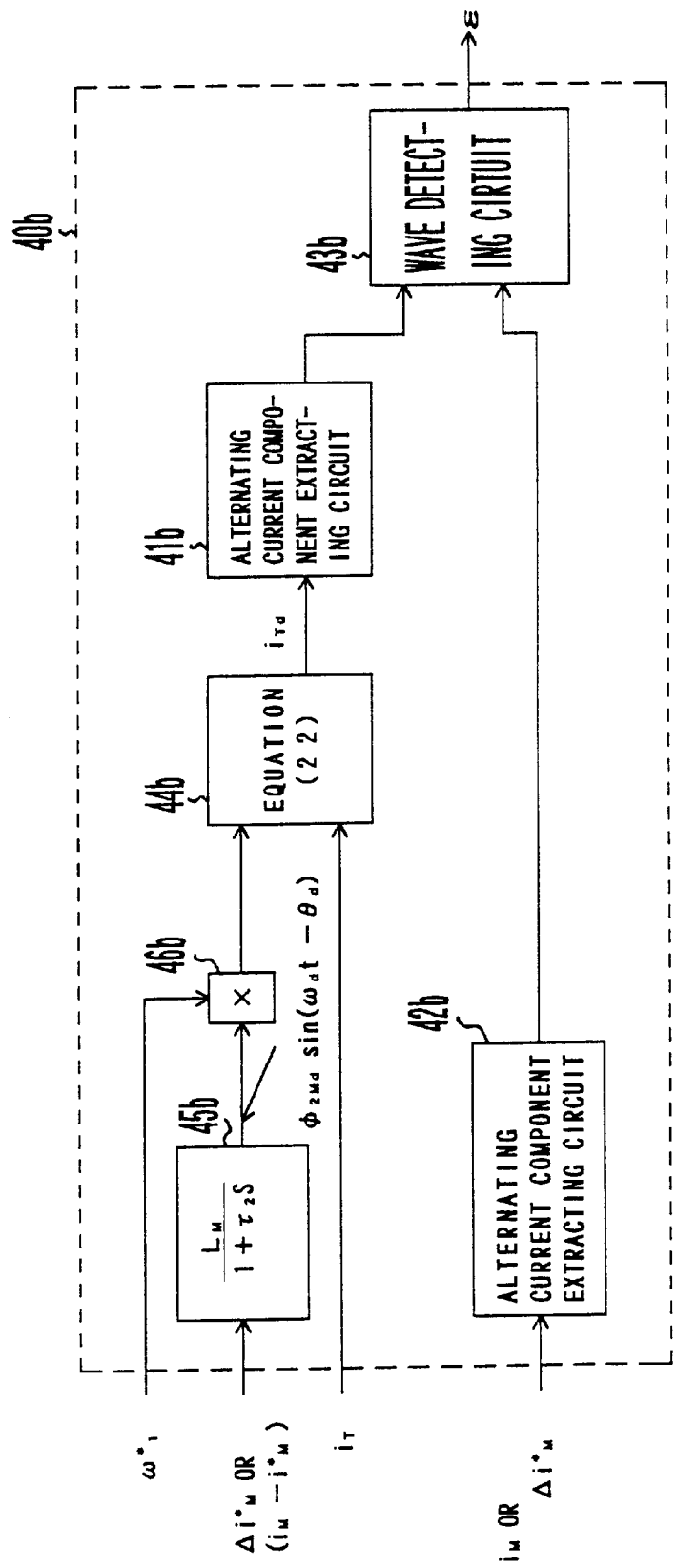
F I G. 1 2

VARIABLE SPEED CONTROLLING DEVICE FOR INDUCTION MOTOR

BACKGROUND OF THE INVENTION

1. Field of the Invention

The present invention relates to a variable speed controlling device for variable-speed-controlling an induction motor (also referred to as a motor or an induction machine), etc.

2. Description of the Related Art

A conventional induction motor driving device controls the magnetic flux and torque of a motor by controlling a voltage or an electric current on rotating coordinates in the direction of a magnetic flux axis of the motor and in the direction of a torque axis orthogonal to the magnetic flux axis. To perform such control, a speed sensor is attached to the motor, or the position of the magnetic flux of the motor is estimated and calculated from the voltage and the electric current, which are applied to the motor (refer to, for example, the description of "Sensorless Vector Control Inverter" on pp.142 to 146, Electric Society Report (DENKIGAKKAISHI) No. 2 of vol.108). That is, if a speed sensor cannot be attached to the motor, or if a cheap motor is used to which a speed sensor is not attached is used, it is general that the position of the magnetic flux of the motor is estimated and calculated from a voltage or an electric current, like in the latter case.

FIG. 1 is a block diagram exemplifying the conventional system.

In this figure, 1 indicates an electric power converting circuit; 2 indicates an induction motor (IM); 6 indicates a voltage command value calculating circuit; 8 and 11 indicate coordinate transforming circuits; 12 indicates an integrator; and 21 indicates an electric current detector. The position of magnetic flux θ* is obtained from a primary angular frequency command value $\omega_1^*$ in the integrator 12, and the coordinate transforming circuit 11 transforms the electric current value detected by the electric current detector 21 into electric current values $i_M$ and $i_T$ on the rotating coordinates by using the position of the magnetic flux θ*. The voltage command value calculating circuit 6 obtains voltage command values $v_M^*$ and $v_T^*$ from the output of the coordinate transforming circuit 11 and the primary angular frequency command value $\omega_1^*$. The coordinate transforming circuit 8 transforms the outputs $v_M^*$ and $v_T^*$ from the voltage command value calculating circuit 6 into a voltage command $v_1^*$, and controls the electric power converting circuit 1 using the voltage command $v_1^*$ for driving the induction motor 2.

In a driving device for an induction motor which does not have a speed sensor attached, however, an error may sometimes occur in the estimation of the position of the magnetic flux, which causes a deviation of an operating point. Especially, this tendency is significant in an operating area in which a primary frequency is low.

The object of the present invention is therefore to implement superior control by obtaining an error signal which varies depending on a deviation of an operating point to be obtained and correcting the deviation of the operating point based on the error signal.

SUMMARY OF THE INVENTION

A variable speed controlling device for an induction motor according to the present invention, which may correspond to claim 1, comprises: supplying means for supplying a voltage and an electric current to the induction motor; control means for controlling a voltage or electric current to be supplied to the induction motor; modulating means for generating a transient phenomenon in the magnetic flux of the induction motor; and extracting means for extracting a component which depends on a slip frequency or a rotation speed of the induction motor from at least one of amounts (or components) of changes of a voltage, an electric current, and a magnetic flux, which are caused by the transient phenomenon, wherein the manipulated variables of the control means are determined based on the output of the extracting means.

In this variable speed controlling device, the modulating means is used for generating an alternating change for the magnetic flux on rotating coordinates which synchronize with the rotating magnetic flux of the induction motor, and the extracting means may extract a component which depends on the slip frequency of the induction motor based on at least one of the amounts (or components) of changes of the voltage, the electric current, and the magnetic flux generated in a direction orthogonal to the direction of the alternating change of the magnetic flux. This feature may correspond to claim 2. Or the modulating means generates an alternating change for the magnetic flux on the stator coordinates of the induction motor, and the extracting means may extract a component which depends on the rotation speed of the induction motor based on at least one of the changes of the voltage, the electric current, and the magnetic flux, which occur in a direction orthogonal to the direction of the alternating change of the magnetic flux. This feature may correspond to claim 3.

According to the variable speed controlling device of this invention, the manipulated variable of the control means may be the magnitude of the voltage or the electric current, which is supplied to the induction motor, or may be a phase (this feature may correspond to claim 4). Or, it may be a frequency of the voltage or the electric current, which is supplied to the induction motor (this feature may correspond to claim 5).

Another variable speed controlling device for an induction motor driven by an electric power converting circuit according to the present invention, which may correspond to claim 6, comprises: a vector rotating device for resolving a primary current of the induction motor into a component (magnetizing current component) in a direction of a magnetic flux axis (M axis) of the induction motor, and a component (torque current component) in a direction of an axis (T axis) orthogonal to the magnetic flux axis, and outputting these components; magnetic flux position calculating means for obtaining a position of the magnetic flux axis with an integration of a primary angular frequency so as to control at least torque of the motor by performing a predetermined control operation based on each of these components and independently adjusting these components; an alternating current signal generating circuit; an adder for adding a generated alternating current signal to a command value of a magnetizing current; a voltage detecting circuit for detecting a voltage of the induction motor; an induced voltage calculating circuit for calculating an induced voltage (electromotive voltage) from a detected voltage value and a detected electric current value; and an error signal calculating circuit, to which the induced voltage and the magnetizing current or the alternating current signal are input, for calculating an error signal resulting from a disaccord between a direction of an actual magnetic flux vector and a direction of a coordinate axis obtained by the magnetic flux position calculating means.

Another variable speed controlling device for an induction motor driven via an electric power converting circuit according to the present invention, which may correspond to claim 7, comprises: a vector rotating device for resolving a primary current of the induction motor into a component (magnetizing current component) in a direction of a magnetic flux axis (M axis) of the induction motor and a component (torque current component) in a direction of an axis (T axis) orthogonal to the magnetic flux axis, and outputting the components; magnetic flux position calculating means for obtaining a position of the magnetic flux axis with an integration of a primary angular frequency so as to control at least torque of the motor by performing a predetermined control operation based on each of the components and independently adjusting the components; an alternating current signal generating circuit; an adder for adding a generated alternating current signal to a command value of a magnetizing current; and an error signal calculating circuit, to which a torque current and the magnetizing current or the alternating current signal are input, for calculating an error signal resulting from a disaccord between a direction of an actual magnetic flux vector and a direction of a coordinate axis obtained by the magnetic flux position calculating means.

Another variable speed controlling device for an induction motor driven via an electric power converting circuit according to the present invention, which may correspond to claim 8, comprises: a vector rotating device for resolving a primary current of the induction motor into a component (magnetizing current component) in a direction of a magnetic flux axis (M axis) of the induction motor, and a component (torque current component) in a direction of an axis (T axis) orthogonal to the magnetic flux axis, and outputting the components; magnetic flux position calculating means for obtaining a position of the magnetic flux axis with an integration of a primary angular frequency so as to control at least a torque of the motor by performing a predetermined control operation based on each of the components and independently adjusting the components; an alternating current signal generating circuit; an adder for adding a generated alternating current signal to a command value of a magnetizing current; a calculating circuit for adding an amount (or value) of a voltage corresponding to magnetic flux which varies depending on an alternating current signal to a voltage command value of the T axis; and an error signal calculating circuit, to which a torque current and the magnetizing current or the alternating current signal are input, for calculating an error signal resulting from a disaccord between a direction of an actual magnetic flux vector and a direction of a coordinate axis obtained by the magnetic flux position calculating means.

The variable speed controlling device for the induction motor corresponding to claims 6 to 8 may further comprise: an adjusting circuit, to which the error signal calculated by the error signal calculating circuit is input, for calculating a voltage correction value of the T axis using the error signal; and another adder for adding the voltage correction value of the T axis to the voltage command value of the T axis. Additionally, the error signal resulting from the disaccord between the direction of the actual magnetic flux vector and the direction of the coordinate axis obtained by the magnetic flux position calculating means, may be corrected (this may correspond to claim 9). Furthermore, according to claim 1 or 9, the frequency for modulating the magnetic flux may be set to be equal to or lower than approximately the cut-off frequency of the secondary circuit of an induction motor (this may correspond to claim 10).

The operation and principle according to this invention are explained prior to the explanation of the embodiments of the present invention.

Normally, the equation of the voltage of an induction motor, which is observed on the rotating coordinates (M–T axes) is represented by the following equation (1).

$$\begin{pmatrix} v_M \\ v_T \\ 0 \\ 0 \end{pmatrix} = \begin{pmatrix} R_1 + pL\sigma & -\omega_1 L\sigma & p & -\omega_1 \\ \omega_1 L\sigma & R_1 + pL\sigma & \omega_1 & p \\ -R_2 & 0 & p + 1/\tau_2 & -\omega_1 + \omega_r \\ 0 & -R_2 & \omega_1 - \omega_r & p + 1/\tau_2 \end{pmatrix} \begin{pmatrix} i_M \\ i_T \\ \phi_{2M} \\ \phi_{2T} \end{pmatrix} \quad (1)$$

$v_M$: primary voltage (M axis)
$v_T$: primary voltage (T axis)
$i_M$: primary current (M axis)
$i_T$: primary current (T axis)
$\phi_{2M}$: secondary magnetic flux (M axis)
$\phi_{2T}$: secondary magnetic flux (T axis)
$R_1$: primary resistance
$R_2$: secondary resistance
$L\sigma$: leakage inductance
$L_M$: excitation inductance
$\tau_2$: secondary time constant (=$L_M/R_2$)
$\omega_1$: primary angular frequency
$W_S$: slip frequency (=$\omega_1-\omega_r$)
p: differential operator
$\omega_r$: rotation speed The voltage of the M axis $v_M$, and the voltage of the T axis $v_T$ are represented as the following equations (2)' and (3)' according to the first and second lines in the above described equation (1).

$$v_M=(R_1+pL\sigma)i_M-\omega_1 L\sigma i_T+p\phi_{2M}-\omega_1\phi_{2T} \quad (2)'$$

$$v_T=(R_1+pL\sigma)i_T+\omega_1 L\sigma i_M+\omega_1\phi_{2M}+p\phi_{2T} \quad (3)'$$

Induced voltages (electromotive) $e_M$ and $e_T$ are represented as the following equations (2) and (3) according to the above equations (2)' and (3)'.

$$e_M=p\phi_{2M}-\omega_1\phi_{2T} \quad (2)$$

$$e_T=\omega_1\phi_{2M}+p\phi_{2T} \quad (3)$$

If the magnetic flux is modulated by adding the alternating signal $\phi_{2MAC}$ to the above described $\phi_{2M}$, $e_T$ is represented by the following equation (4).

$$e_T=\omega_1(\phi_{2M}+\phi_{2MAC})+p\phi_{2T} \quad (4)$$

Additionally, $p\phi_{2T}$ is represented by the following equation (5) according to the fourth line in the equation (1).

$$p\phi_{2T} = \frac{p}{p+1/\tau_2}\left(\frac{R_2 i_T}{\phi_{2M}} - \omega_s\right)\phi_{2M} \quad (5)$$

Here, the schematic of the magnetic flux vector is as shown in FIG. 2 if there is no deviation of the operating point, and therefore:

$$\phi_{2T}=0, \omega_S=R_2 i_T/\phi_{2M} \quad (6)$$

However, if there is a deviation of the operating point, the schematic of the magnetic flux is as shown in FIG. 3, and therefore:

$$\phi_{2T}\neq 0, \omega_S\neq R_2 i_T/\phi_{2M} \quad (7)$$

Note that the M–T axes shown in FIG. 2 and FIG. 3 are coordinate axes determined by a controlling system, while the M'–T' axes indicate coordinate axes according to the direction of the actual magnetic flux vector of the motor.

Since $p\ \phi_{2M}\neq 0$ if the magnetic flux is modulated by using an alternating current signal, the component depending on $(\omega_S-R_2\ i_T/\phi_{2M})$ appears in $p\phi_{2T}$. This means that $p\phi_{2T}$ is the error signal depending on a control error of the slip frequency $\omega_S$. Furthermore, because only $p\phi_{2T}$ is the alternating component on the right side of the above described equation (4) if the component of modulation of the magnetic flux $\phi_{2MAC}$ is deleted, $p\phi_{2T}$ can be separated and extracted with an operation or calculation such as an alternating current extraction, etc.

As described above, it is proved that the error signal $\epsilon$ (proportional to $p\phi_{2T}$) which depends on the slip frequency can be obtained if the secondary magnetic flux is modulated on the rotating coordinates (this corresponds to claim 2). Therefore, adjusting the voltage, the electric current, or the frequency by using the error signal $\epsilon$ eliminates the deviation of the operating point, thereby restoring the state to one where there is no control error (corresponding to claims 4 and 5).

Next, the case where control is performed in order to accord the actual value of the electric current of the M axis with its command value using an electric current adjustor will be considered, for example, by adding the alternating current signal $\Delta i_M^* = i_{Md} \sin \omega_d t$ ($i_{Md}$ indicates the amplitude of $\Delta_{iM}$, and $\omega_d$ indicates the angular frequency) to the electric current command value of the M axis, as a specific means for modulating the magnetic flux. At this time:

$$i_M = i_M^* + i_{Md} \sin \omega_d t \tag{8}$$

Accordingly, the secondary magnetic flux $\phi_{2M}$ will become:

$$\phi_{2M} = \phi_{2MO} + \phi_{2Md} \sin(\omega_d t - \theta_d) \tag{9}$$

Note that, however:

$$\phi_{2Md} = L_M i_{Md}/\{1+(\omega_d \tau_2)^2\}^{1/2}\quad \theta_d = \tan^{-1}(\omega_d \tau_2)$$

According to the above described equation, if the frequency of the modulation frequency $\omega_d$ is much higher than the cut-off frequency of the secondary circuit $1/\tau_2$, the amplitude of the magnetic flux modulation is attenuated and the modulation cannot be sufficiently performed. To prevent this, $\omega_d$ must be set to approximately $1/\tau_2$ or lower (corresponding to claim 10).

Next, if the equation (9) is substituted into the equation (3), the component $e_T$ of the T axis of the counter-electromotive voltage will become:

$$e_T = \omega_1\{\phi_{2MO}+\phi_{2Md}\sin\,g\,(\omega_d t-\theta_d)\}+p\phi_{2T} \tag{10}$$

Here, the case where there is a deviation of the operating point due to the error of the control operation will be considered, as shown in FIG. 3. That is, if there is the deviation of the operating point, the direction of the magnetic flux does not accord with the M axis. Accordingly, $\phi_{2M}$ has an alternating error, and at the same time, $p\phi_{2T}\neq 0$. Here, if the error of $\phi_{2M}$ is shown by $\Delta\phi_{2M}$, $\phi_{2M}$ is represented by the following equation.

$$\phi_{2M}=\phi_{2MO}+\phi_{2Md}\sin(\omega_d t-\theta_d)+\Delta\phi_{2M} \tag{11}$$

If this equation is substituted into the equation (3), $e_T$ will become:

$$e_T=\omega_1\{\phi_{2MO}+\phi_{2Md}\sin(\omega_d t-\theta_d)\}+\omega_1\Delta\phi_{2M}+p\phi_{2T} \tag{12}$$

As described above, $e_T$ includes the component $p\phi_{2T}$ caused by the control error. This component is the modulation component obtained by adding the alternating current signal $\Delta i_M^*$ to the magnetizing current command value, and at the same time, it is the alternating component. The other terms are the components of direct currents. Therefore, the component $p\phi_{2T}$ can be extracted by the means of an extraction operation of the alternating component, a wave detection operation, etc.

As described above, the error signal $\epsilon$ (proportional to $p\phi_{2T}$) caused by the disaccord between the direction of the actual magnetic flux vector of the motor and the direction of the coordinate axis, can be obtained (corresponding to claim 6).

In the meantime, the torque current $i_T$ flows due to the difference between the voltage of the T axis $v_T$ and the induced voltage $e_T$. Here, the case where the voltage command value of the T axis $v_T^*$ is provided as the following equation (13) will be considered.

$$v_T^*=(R_1+pL\sigma)i_T-\omega_1 L\sigma i_M-107\ _1\phi_{2MO} \tag{13}$$

At this time, the torque current will become:

$$i_T = (v_T - e_T)/(R_1 + pL\sigma) \tag{14}$$
$$= \{\omega_1\phi_{2Md}\sin(\omega_d t - \theta_d) - \omega_1\Delta\phi_{2M} - p\phi_{2T}\}/(R_1 + pL\phi)$$

This equation includes the term $p\phi 2_T$ caused by the control error.

If the term according to the component of the change of the magnetic flux $\phi_{2Md}\sin(\omega_d t-\theta_d)$ caused by $\Delta i_M$ is subtracted from the equation (14), the alternating component is only $\phi_{2T}$. Therefore, the error signal $\epsilon$ can be obtained by extracting this component (corresponding to claim 7).

Instead of subtracting the term of the component of the change of the magnetic flux $\phi_{2Md}\sin(\omega_d t-\theta_d)$ caused by $\Delta i_M^*$, if the voltage command value of the T axis is provided as:

$$v_T^*=*(R_1+pL\sigma)i_T-\omega_1 L\sigma i_M+\omega_1\{\phi_{2MO}+\phi_{2Md}\sin(\omega_d t-\theta_d)\} \tag{15}$$

the torque current becomes:

$$i_T = (v_T - e_T)/(R_1 + pL\sigma) \tag{16}$$
$$= (-\omega_1\Delta\phi_{2M} - p\phi_{2T})/(R_1 + pL\sigma)$$

In this case, because the alternating current component of $i_T$ is only the term $p\phi_{2T}$, which is proportional to the control error, the error signal $\epsilon$ can be obtained by extracting this component (corresponding to claim 8). Adjusting the voltage of the T axis by using the thus-obtained error signal $\epsilon$ allows the torque current to be suitably adjusted and the deviation of the operating point to be eliminated. Consequently, the deviation of the actual magnetic flux from the coordinate axis can be eliminated, thereby restoring the state to one where there is no control error (corresponding to claim 9).

Provided next is the explanation about the case where the magnetic flux is modulated in a stator coordinate system.

The voltage equation of the induction machine observed on the stator coordinates ($\alpha$–$\beta$ axes) is represented by the following equation (17). Here, the $\alpha$ axis is an arbitrary stationary coordinate axis, while the $\beta$ axis is the coordinate axis orthogonal to the $\alpha$ axis.

$$\begin{pmatrix} v_\alpha \\ v_\beta \\ 0 \\ 0 \end{pmatrix} = \begin{pmatrix} R_1 + pL\sigma & 0 & p & 0 \\ 0 & R_1 + pL\sigma & 0 & p \\ -R_2 & 0 & p + 1/\tau_2 & \omega_r \\ 0 & -R_2 & -\omega_r & p + 1/\tau_2 \end{pmatrix} \begin{pmatrix} i_\alpha \\ i_\beta \\ \phi_{2\alpha} \\ \phi_{2\beta} \end{pmatrix} \quad (17)$$

$v_\alpha$: primary voltage ($\alpha$ axis)
$v_\beta$: primary voltage ($\beta$ axis)
$i_\alpha$: primary current ($\alpha$ axis)
$i_\beta$: primary current ($\beta$ axis)
$\phi_{2\alpha}$: secondary magnetic flux ($\alpha$ axis)
$\beta_{2\beta}$: secondary magnetic flux ($\beta$ axis)

The induced (electromotive) voltages $e_\alpha$ and $e_\beta$ in this case are represented by the following equations.

$$e_\alpha = p\phi_{2\alpha} \quad (18)$$

$$e_\beta = p\phi_{2\beta} \quad (19)$$

Analyzing $p\phi 2\beta$ in a similar manner as in the rotating coordinate system, the following equation (20) can be obtained. According to this equation, $p\phi 2\beta$ is proved to become the error signal depending on the rotation speed.

$$e_\beta = p\phi_{2\beta} = \frac{p}{p + 1/\tau_2}(R_2 i_\beta + \omega_r \phi_{2\alpha}) \quad (20)$$

Here, $\phi_{2\alpha}$ and $\phi_{2\beta}$ indicate alternating components unlike in the rotating coordinate system. However, they can be regarded as the components of a direct current or the components of a slow change at the operating point whose primary angular frequency is extremely small. At this time, if $\phi_{2\alpha}$ is modulated by using the alternating current having at least one type or more of a frequency component, only the error signal depending on the rotation signal appears as the alternating component according to the equation (20).

If the magnetic flux is modulated by using an alternating signal as described above, the error signal depending on the rotation speed is proved to appear in the induced voltage on the orthogonal coordinates (corresponding to claim 3). The technique of claim 1 can be derived from the technique of claim 3 and claim 2. Furthermore, adjusting the voltage, the electric current, or the frequency by using the above described error signal eliminates the deviation of the operating point, thereby restoring the state to one where there is no control error (corresponding to claims 4 and 5).

BRIEF DESCRIPTION OF THE DRAWINGS

FIG. 5 is a block diagram showing the configuration of a modification of the first embodiment;

FIG. 12 shows a second specific example of the error calculating circuit;

DESCRIPTION OF THE PREFERRED EMBODIMENTS

Figure 1:
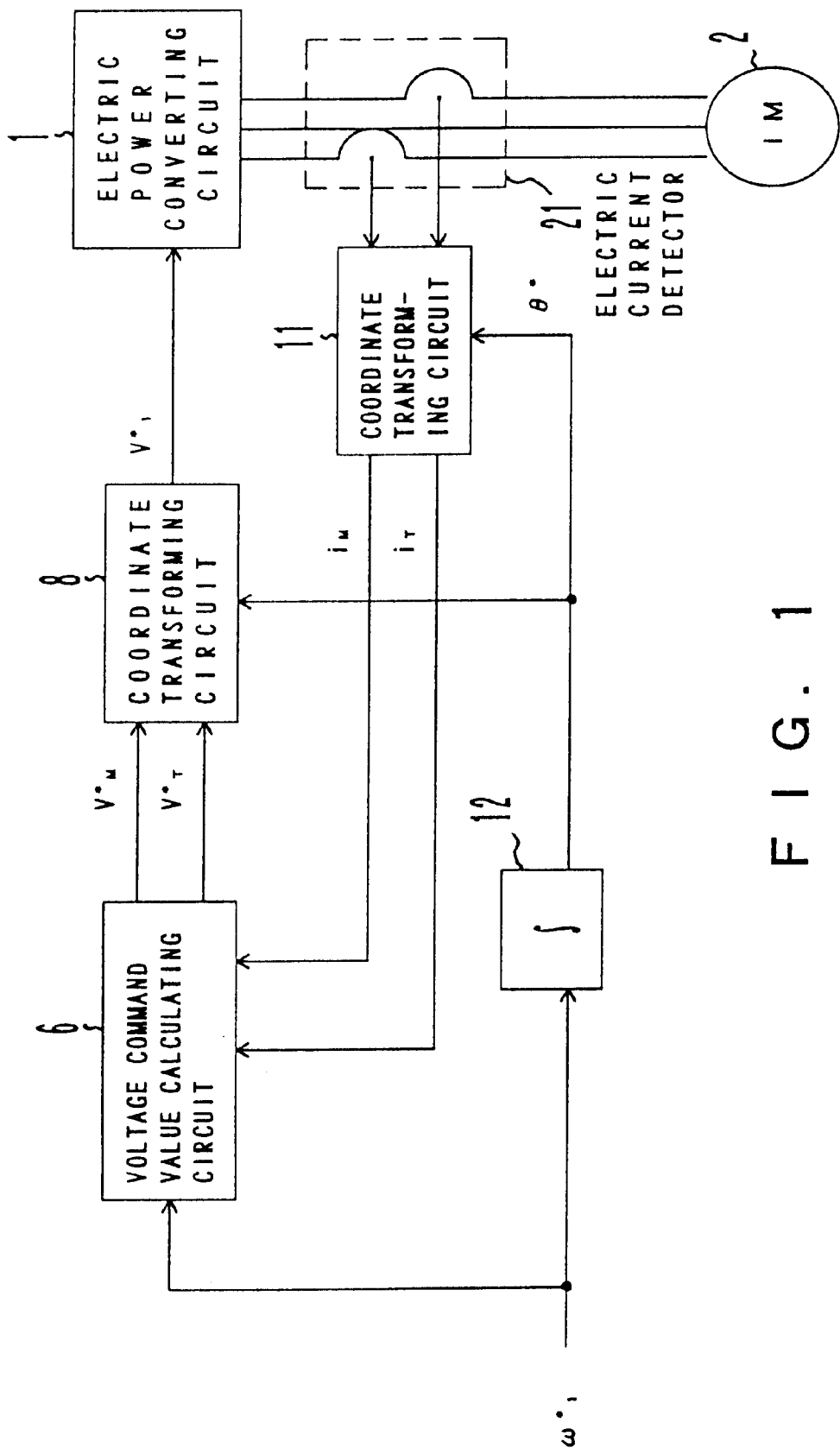
FIG. 1 is a block diagram showing the configuration of a conventional induction motor driving device.
Figure 2:
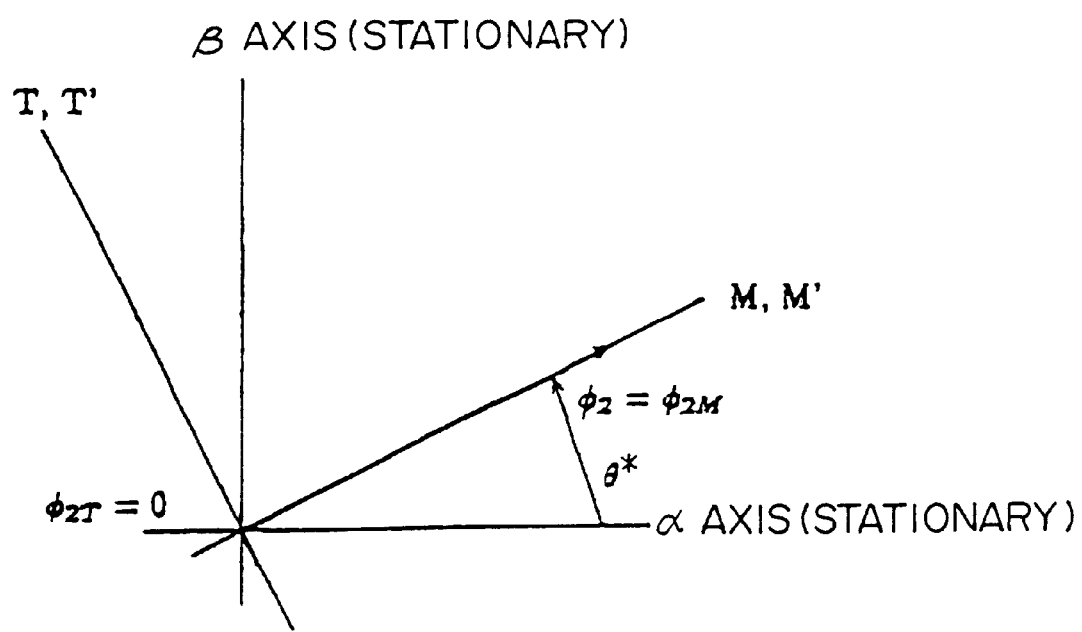
FIG. 2 is a diagram showing a magnetic flux vector if there is no deviation of an operating point.
Figure 3:
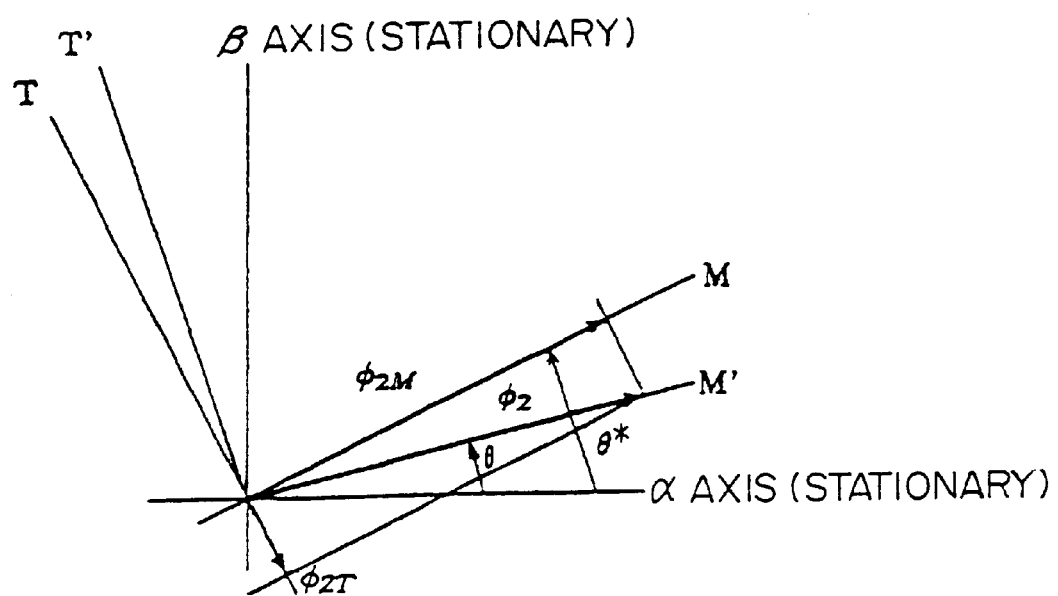
FIG. 3 is a diagram showing the magnetic flux vector if there is a deviation of the operating point.
Figure 4:
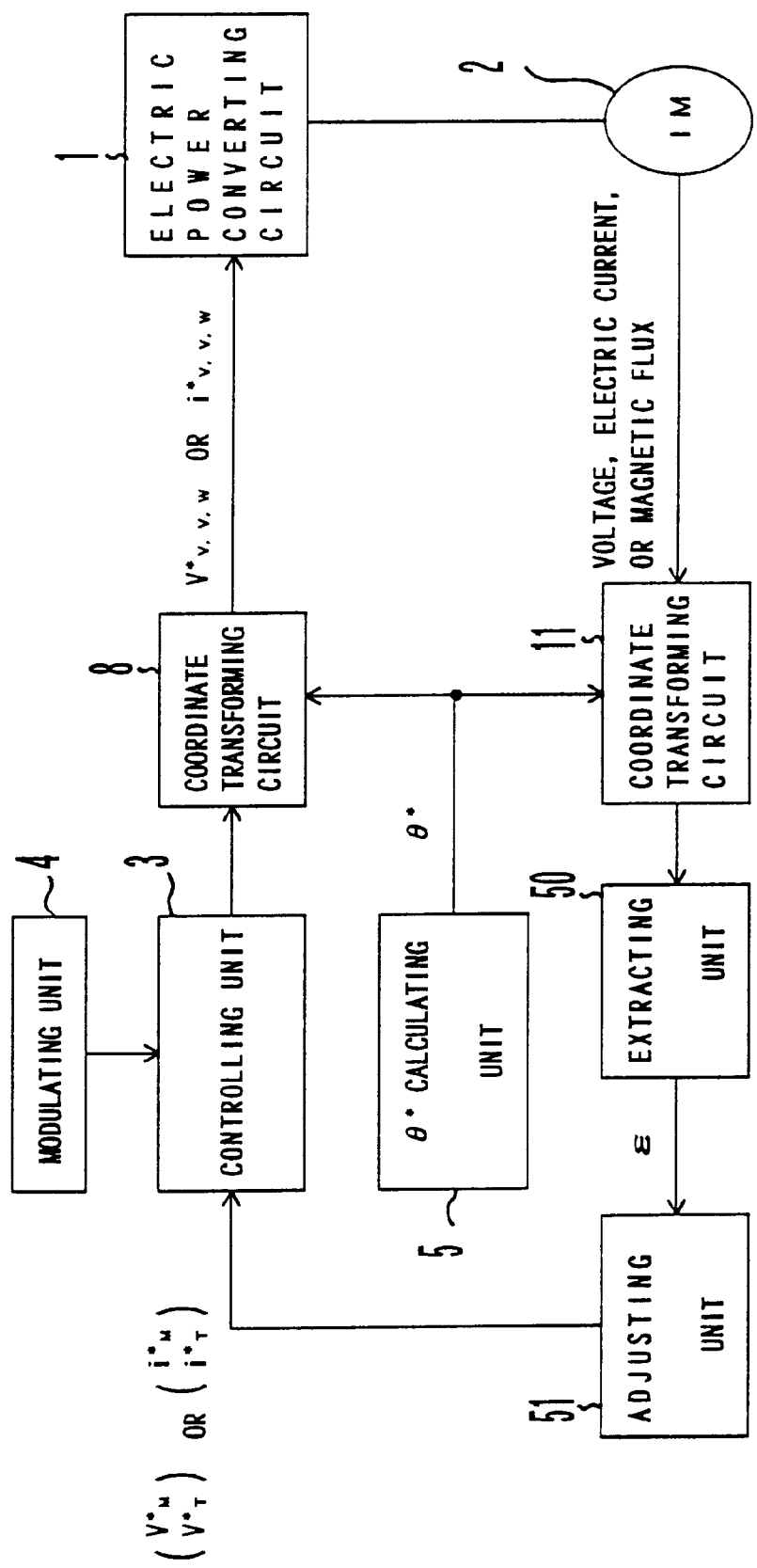
FIG. 4 is a block diagram showing the configuration of a first embodiment according to the present invention.

FIG. 4 is a block diagram showing the configuration of a first embodiment according to the present invention, which may correspond to claims 1, 2, and 4.

In this figure, 1 indicates an electric power converting circuit; 2 indicates an induction machine (IM); 3 indicates a controlling unit (first controlling unit); 4 indicates a modulating unit; 5 indicates a θ* calculating unit; 50 indicates an extracting unit; 51 indicates an adjusting unit; and 8 and 11 indicate coordinate transforming circuits.

The modulating unit 4 and the controlling unit 3 input to the coordinate transforming circuit 8 the voltage command or the electric current command for generating an alternating change of the magnetic flux on rotating coordinates which synchronize with the rotating magnetic flux of the induction machine 2. The coordinate transforming circuit 8 performs rotating coordinate transformation for the voltage command or the electric current command based on the phase angle θ* of the magnetic flux, and outputs the voltage command values v*$_{u,v,w}$ or the electric current command values i*$_{u,v,w}$ on stator coordinates to the electric power converting circuit 1. The electric power converting circuit 1 performs electric power conversion based on either of the command values, so as to drive the induction machine 2.

At least one of the voltage, the electric current, and the value of the magnetic flux of the induction machine 2, which are detected on the stator coordinates, is coordinate-transformed into values (or amounts) on the rotating coordinates by the coordinate transforming circuit 11, and the values are input to the extracting unit 50. The extracting unit 50 extracts components which depend on the slip frequency of the induction machine 2 from at least one of the amounts (or components) of changes of the voltage, the electric current, and the magnetic flux, which are generated by the alternating change of the magnetic flux, and outputs the extracted components as the error signal $\epsilon$. The adjusting unit 51 receives the error signal $\epsilon$, performs a predetermined control operation using the input, and outputs the voltage command value $v_M$* and $v_T$* or the electric current command value $i_M$* and $i_T$*, which are input and used in the controlling unit 3.

FIG. 5 is a block diagram exemplifying a modification of the first embodiment shown in FIG. 4, which may correspond to claims 1, 2, and 5.

Since the difference from the first embodiment of FIG. 4 is only the point that the frequency command value $\omega_1$* which is output from the adjusting unit 51 is input to the controlling unit 3 and the θ* calculating unit 5, the detailed explanations of this embodiment are omitted here.

Figure 6:
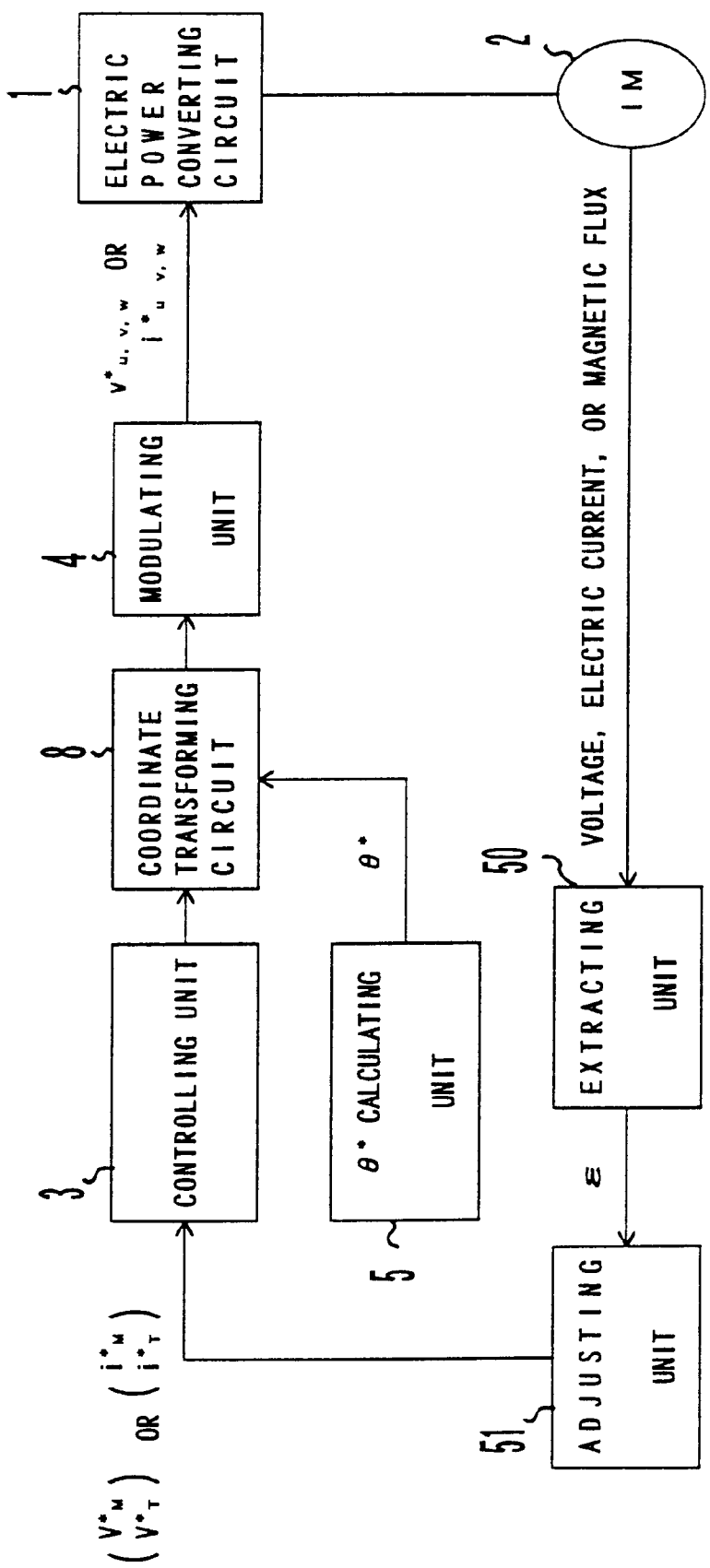
FIG. 6 is a block diagram showing the configuration of a second embodiment according to the present invention.

FIG. 6 is a block diagrams showing the configuration of a second embodiment according to the present invention, which may correspond to claims 1, 3, and 4.

The differences from the first embodiment of FIG. 4 are the point that the modulating unit 4 is interposed between the coordinate transforming circuit 8 and the electric power converting circuit 1; the point that at least one of the values of the voltage, the electric current, and the magnetic flux of the induction machine 2, which are detected on the stator coordinates, is directly input to the extracting unit 50; and the point that the extracting unit 50 extracts the component which depends on the rotation speed of the induction machine 2 from at least one of the amount of changes of the voltage, the electric current, and the magnetic flux, which are generated by an alternating change of the magnetic flux, and outputs the extracted component as the error signal ε, etc.

Figure 7:
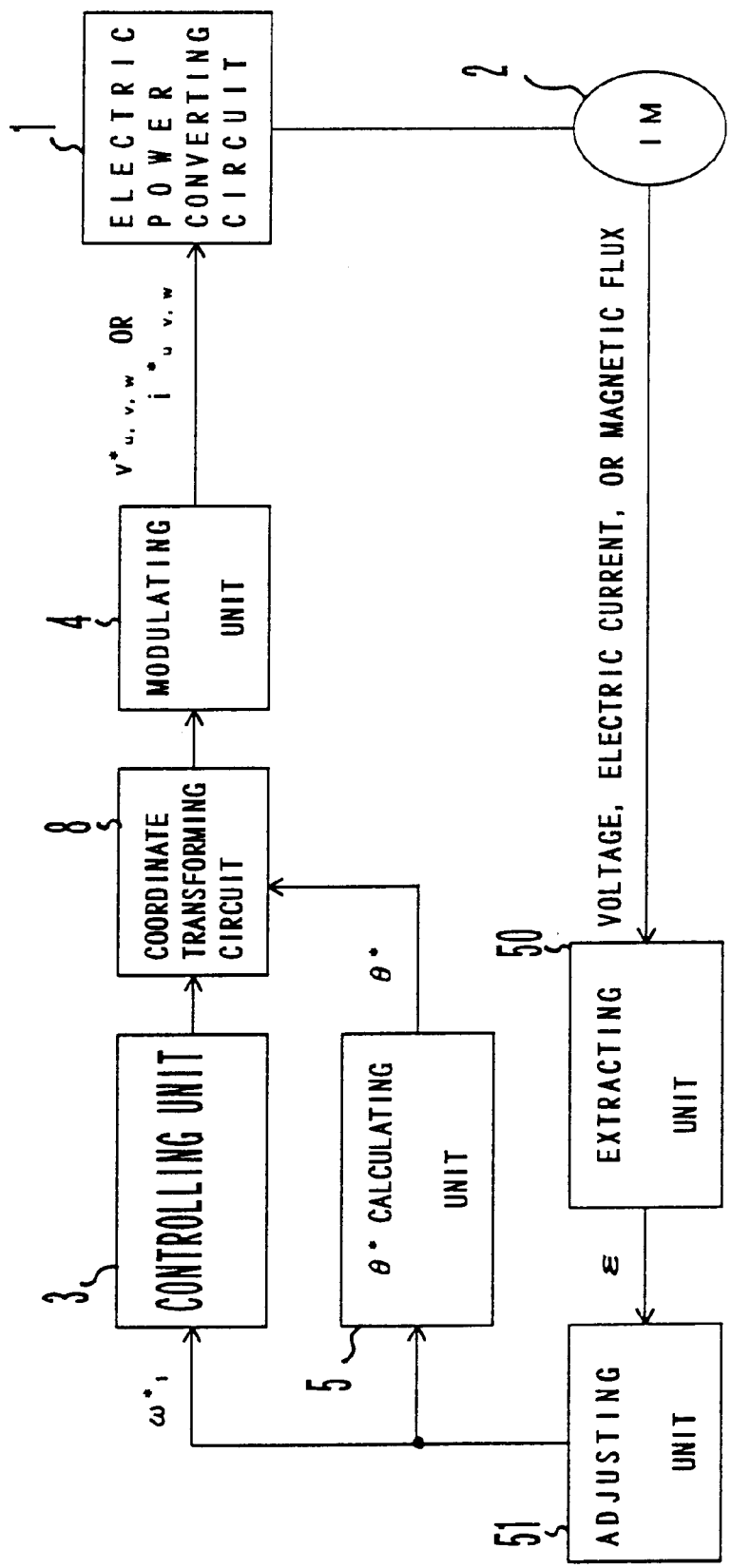
FIG. 7 is a block diagram showing the configuration of the second embodiment.

FIG. 7 is a block diagram exemplifying a modification of the second embodiment shown in FIG. 6, which may correspond to claims 1, 3, and 5.

Since the difference from the second embodiment of FIG. 6 is only the point that the frequency command value $\omega_1^*$ output from the adjusting unit 51 is input to the controlling unit 3 and the θ* calculating unit 5, the detailed explanations of this embodiment are omitted here.

Figure 8:
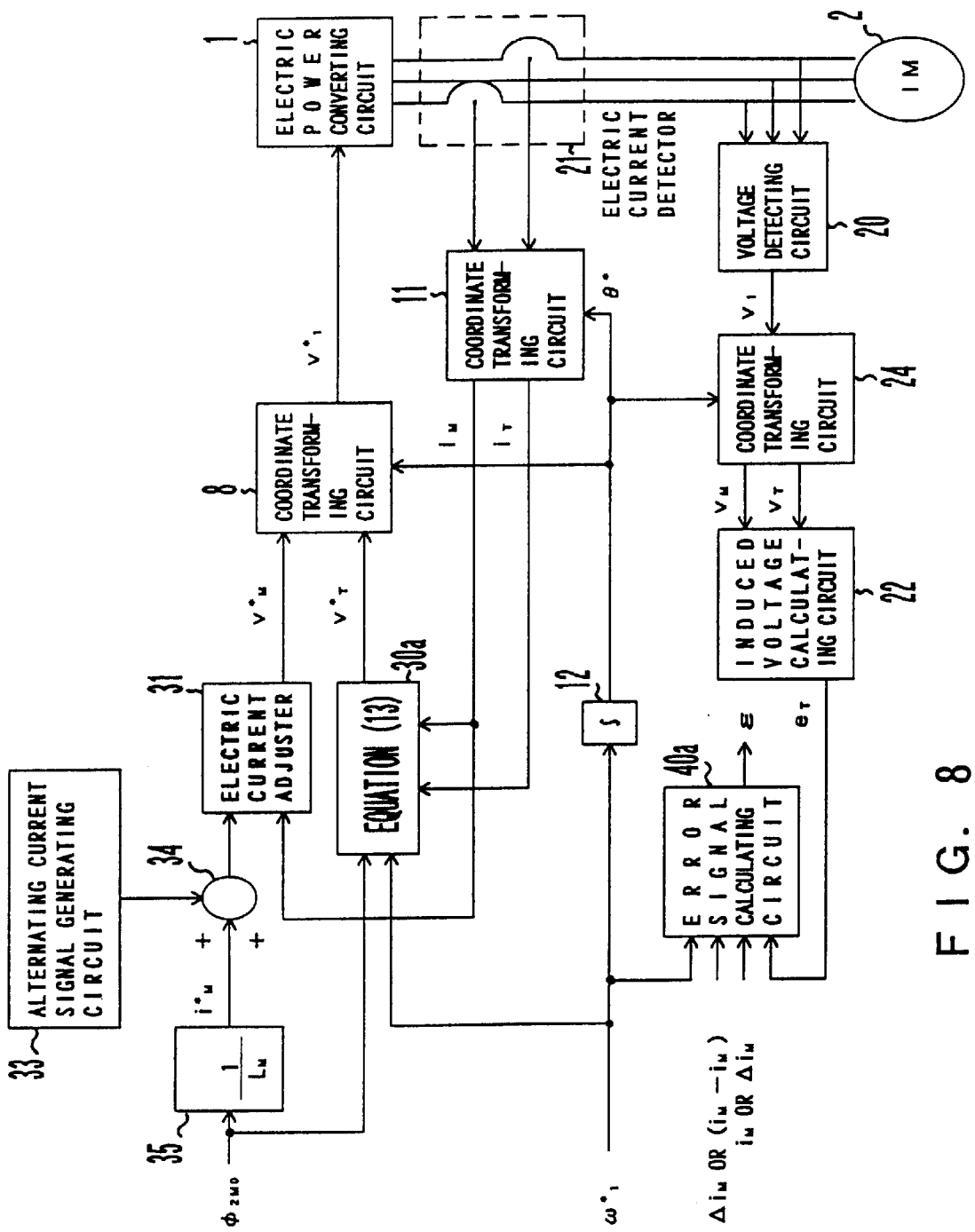
FIG. 8 is a block diagram showing the configuration of a third embodiment according to the present invention.

FIG. 8 is a block diagram showing the configuration of a third embodiment according to the present invention, which may correspond to claim 6.

An alternating current signal $\Delta i_M^*$ generated by an alternating current generating circuit 33 is added to a magnetizing current command value $i_M^*$ which is output from the calculating circuit 35 by an adder 34, and input to an electric current adjustor 31. The electric current adjustor 31 performs an adjusting operation so that the output of the adder 34 accords with the magnetizing current $i_M$ input from the coordinate transforming circuit 11.

A T axis voltage command calculating circuit 30a calculates the T axis voltage command $v_T^*$ based on the above described equation (13). An error signal calculating circuit 40a, to which four signals such as (1) the primary angular frequency command value $\omega_1^*$ (2) the induced voltage $e_T$, (3) $\Delta i_M^*$ or $(i_M - i_M^*)$ and (4) $i_M$ or $\Delta i_M^*$ are input, outputs the error signal ε.

Figure 9:
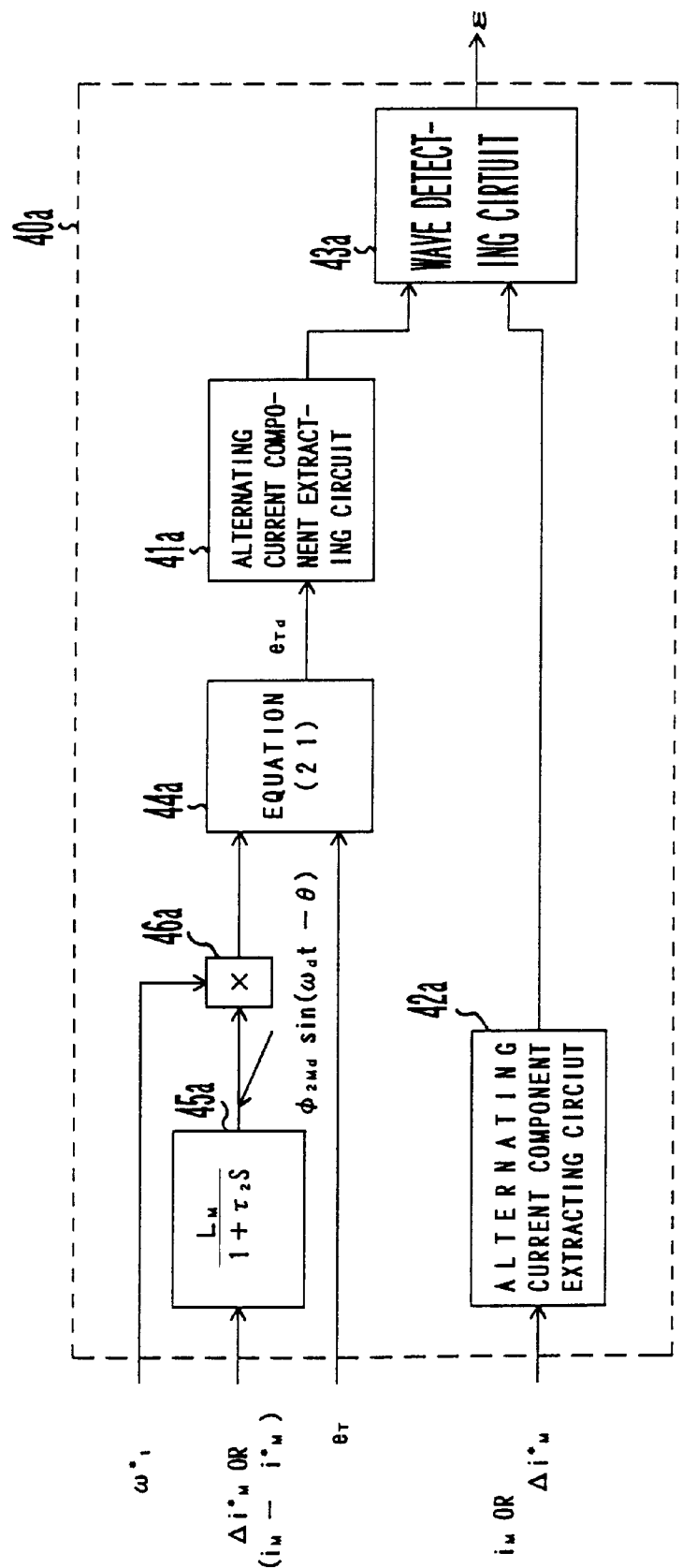
FIG. 9 shows a first specific example of an error calculating circuit.

FIG. 9 shows a specific example of the error signal calculating circuit 40a (first error signal calculating circuit).

An alternating current component extracting circuit 41a extracts and outputs the component of an alternating current $e_{Td}$ output from a calculating circuit 44a, while an alternating current component extracting circuit 42a extracts and outputs the component of an alternating current $i_M$ or $\Delta i_M^*$. A wave detecting circuit 43a, to which these two components of an alternating current are input, performs a wave detection operation using the two components, and outputs the error signal ε. Remember that $\Delta i_M^*$ does not originally include the component of a direct current. Therefore, if $\Delta i_M^*$ is used as a fourth input of the error signal calculating circuit 40a, the alternating current component extracting circuit 42a may be omitted. The calculation of $e_{Td}$ is performed according to the following equation (21).

$$e_{Td} = e_T - \omega_1^* \{\phi_{2MO} + \phi_{2MD} \sin(\omega_d t - \theta_d)\} \tag{21}$$

At this time, the second term of the equation (21) is obtained by the calculating circuit 45a and a multiplier 46a.

Figure 10:
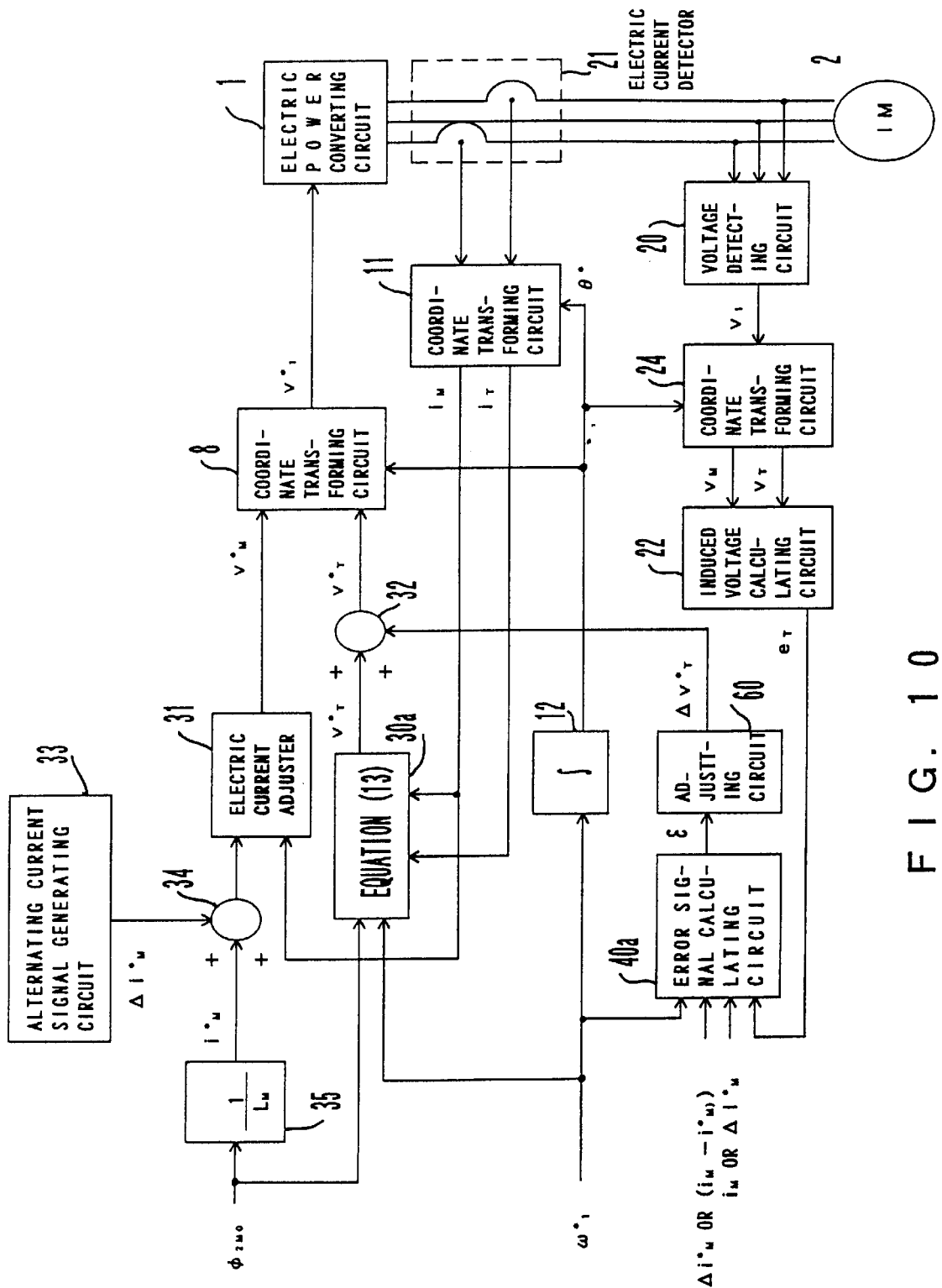
FIG. 10 is a block diagram showing the configuration of a fourth embodiment according to the present invention.

FIG. 10 is a block diagram showing the configuration of a fourth embodiment according to the present invention, which may correspond to claims 6 and 9.

In this embodiment, an adjusting circuit 60 which receives the error signal ε and outputs the T axis voltage correction value $\Delta v_T^*$, and an adder 32 which adds the T axis voltage correction value $\Delta v_T^*$ to the T axis voltage command value $v_T^*$, are added to the third embodiment shown in FIG. 8 in order to correct the error.

Figure 11:
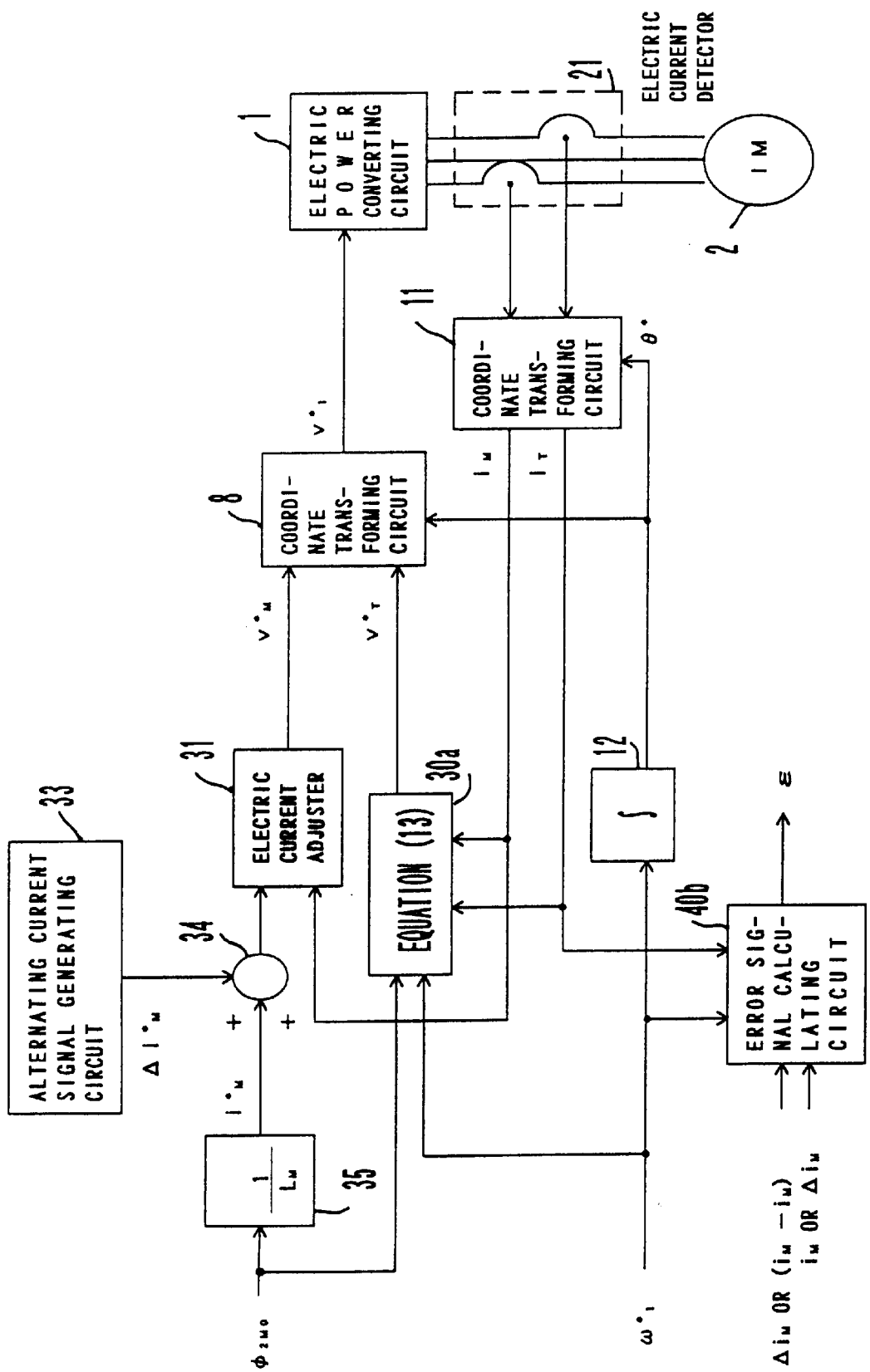
FIG. 11 is a block diagram showing the configuration of a fifth embodiment according to the present invention.

FIG. 11 is a block diagram showing the configuration of a fifth embodiment according to the present invention, which may correspond to claim 7.

This embodiment is characterized in that the voltage detecting circuit 20, the coordinate transforming circuit 24, and the induced voltage calculating circuit 22 are omitted from the third embodiment shown in FIG. 8, and the error signal ε is calculated in an error signal calculating circuit 40b. The error signal calculating circuit 40b inputs the four signals such as (1) the primary angular frequency command value $\omega_1^*$, (2) the torque current $i_T$ (3) $\Delta i_M^*$ or $(i_M - i_M^*)$, and (4) $i_M$ or $\Delta i_M^*$, and calculates and outputs the error signal ε using these four signals.

FIG. 12 shows a specific example of the error signal calculating circuit (second error signal calculating circuit) 40b.

The difference from the error signal calculating circuit 40a of FIG. 9 is the point that the input of the alternating current component extracting circuit 41b is $i_{Td}$ which is output from the calculating circuit 44b. The calculation of $i_{Td}$ is performed by the following equation (22).

$$i_{Td} = i_T - \omega_1^* \phi_{2MD} \sin(\omega_d t - \theta_d)/(R_1 + pL\sigma) \tag{22}$$

At this time, the numerator of the second term of the equation (22) is obtained by a calculating circuit 45b and a multiplier 46b. Because $\Delta i_M$ does not originally include the component of a direct current, the alternating current component extracting circuit 42b may be omitted if $\Delta i_M^*$ is used as the fourth input of the error signal calculating circuit 40b.

Figure 13:
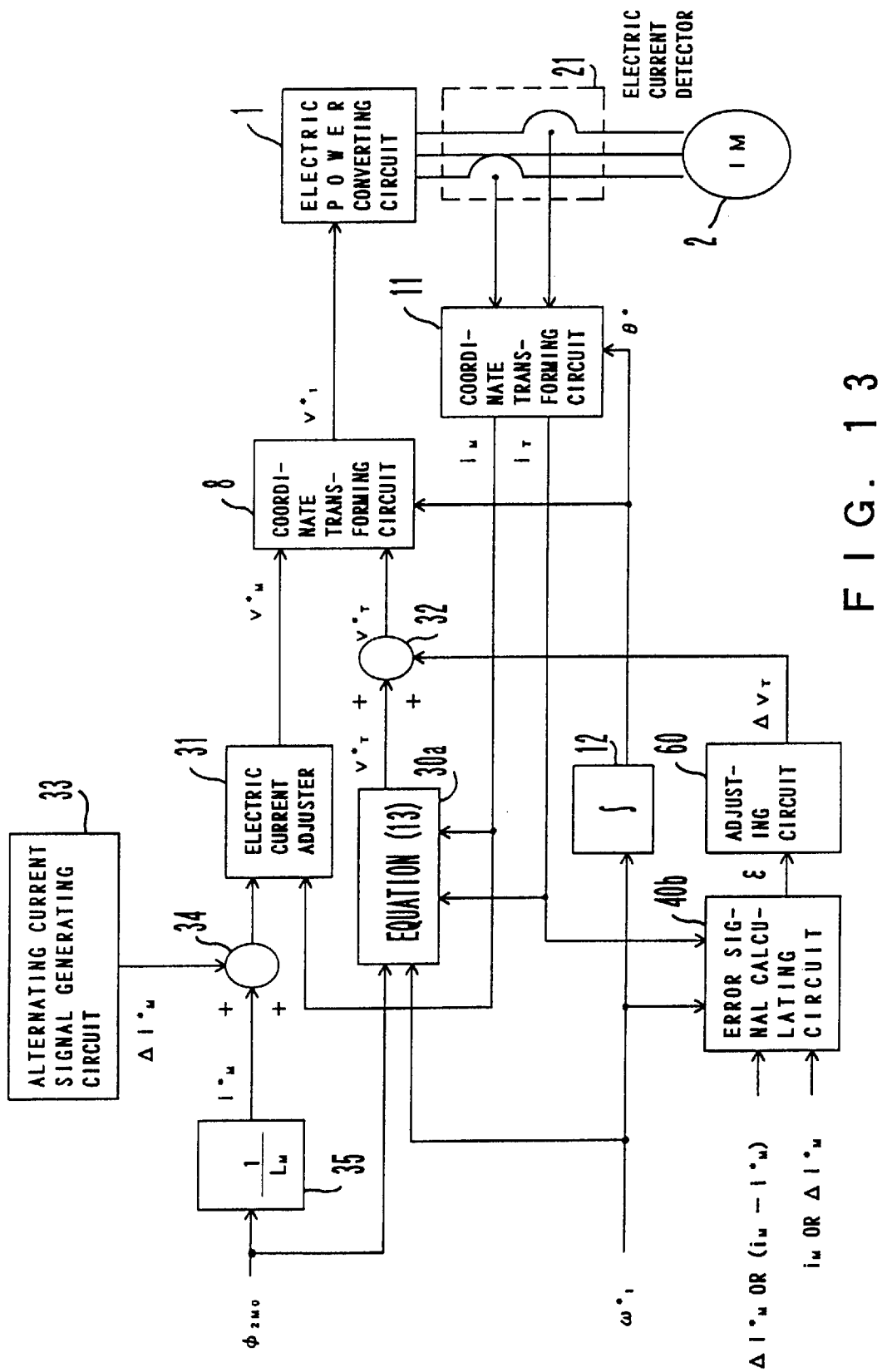
FIG. 13 is a block diagram showing the configuration of a sixth embodiment according to the present invention.

FIG. 13 is a block diagram showing the configuration of a sixth embodiment according to the present invention, which may correspond to claims 7 and 9.

In this embodiment, an adjusting circuit 60 which receives the error signal ε and outputs T axis voltage correction value $\Delta v_T^*$, and an adder 32 which adds $\Delta v_T$ to $v_T^*$ are added to the fifth embodiment shown in FIG. 11 in order to correct the error.

Figure 14:
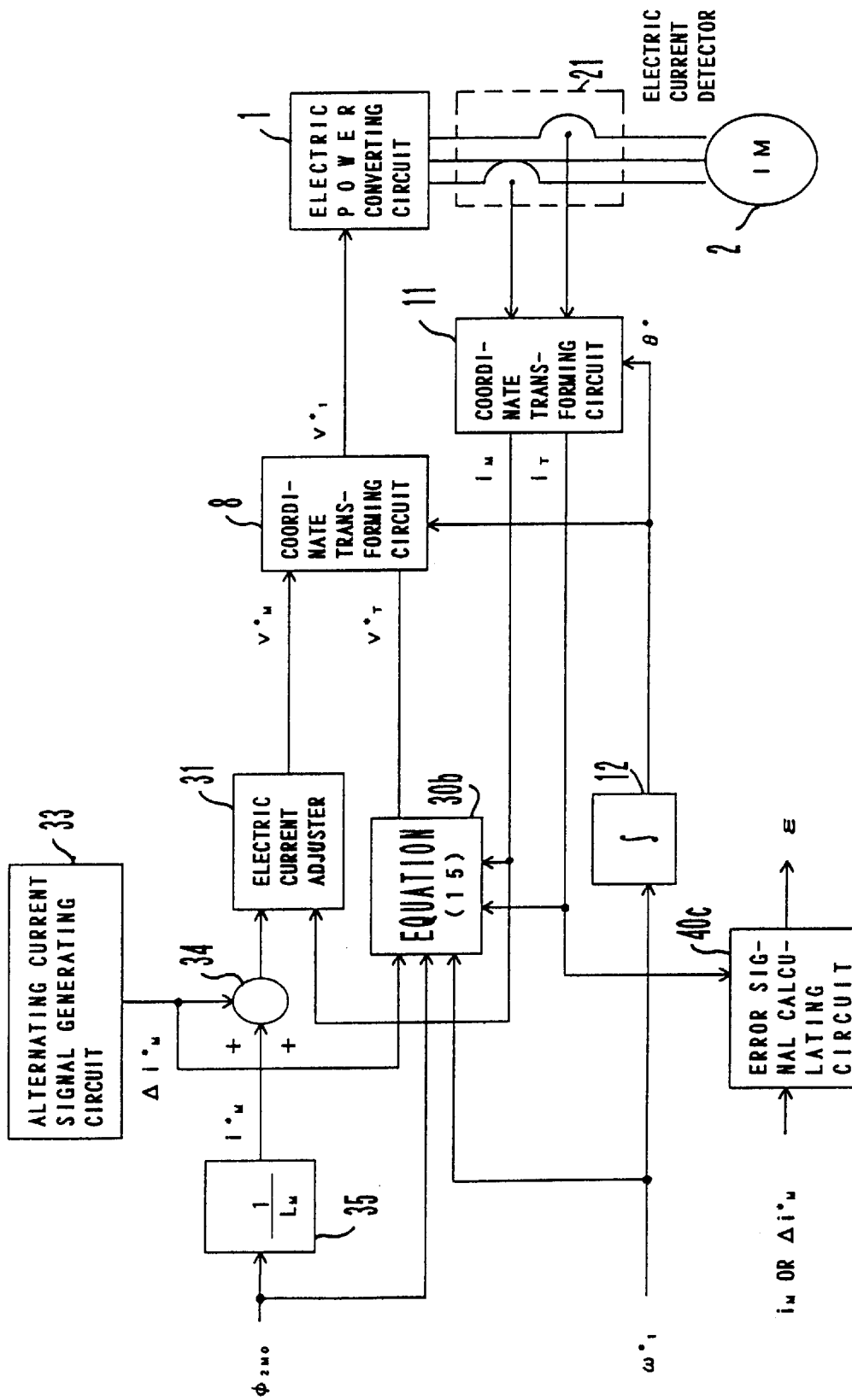
FIG. 14 is a block diagram showing the configuration of a seventh embodiment of the present invention.

FIG. 14 is a block diagram showing the configuration of a seventh embodiment according to the present invention, which corresponds to claim 8.

The differences from the fifth embodiment of FIG. 11 are the point that the T axis voltage command value $v_T^*$ is calculated by the calculating circuit 30b based on the above described equation (15), and the point that the error signal ε is calculated by the error signal calculating circuit 40c. The error signal calculating circuit 40c receives the two signals such as (1) the torque current $i_T$ and (2) $i_M$ or $\Delta i_M^*$, and outputs the error signal ε using these two signals.

Figure 15:
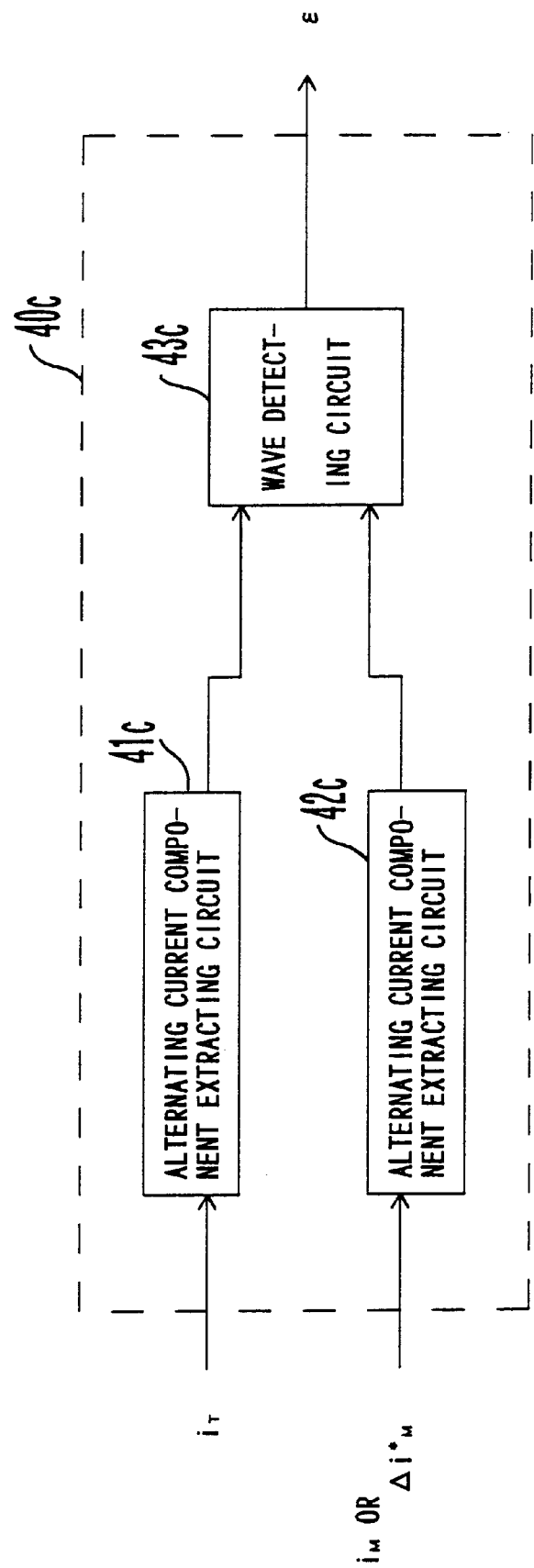
FIG. 15 shows a third specific example of the error calculating circuit.

FIG. 15 shows a specific example of the error signal calculating circuit (third error signal calculating circuit) 40c.

The difference from the error signal calculating circuit shown in FIG. 12 is the point that the torque current $i_T$ is used as the input of the alternating current component extracting circuit 41c. Since $\Delta i_M^*$ does not originally include the component of a direct current, the alternating current component extracting circuit 42c may be omitted if $\Delta i_M^*$ is used as the second input of the error signal calculating circuit 40c.

Figure 16:
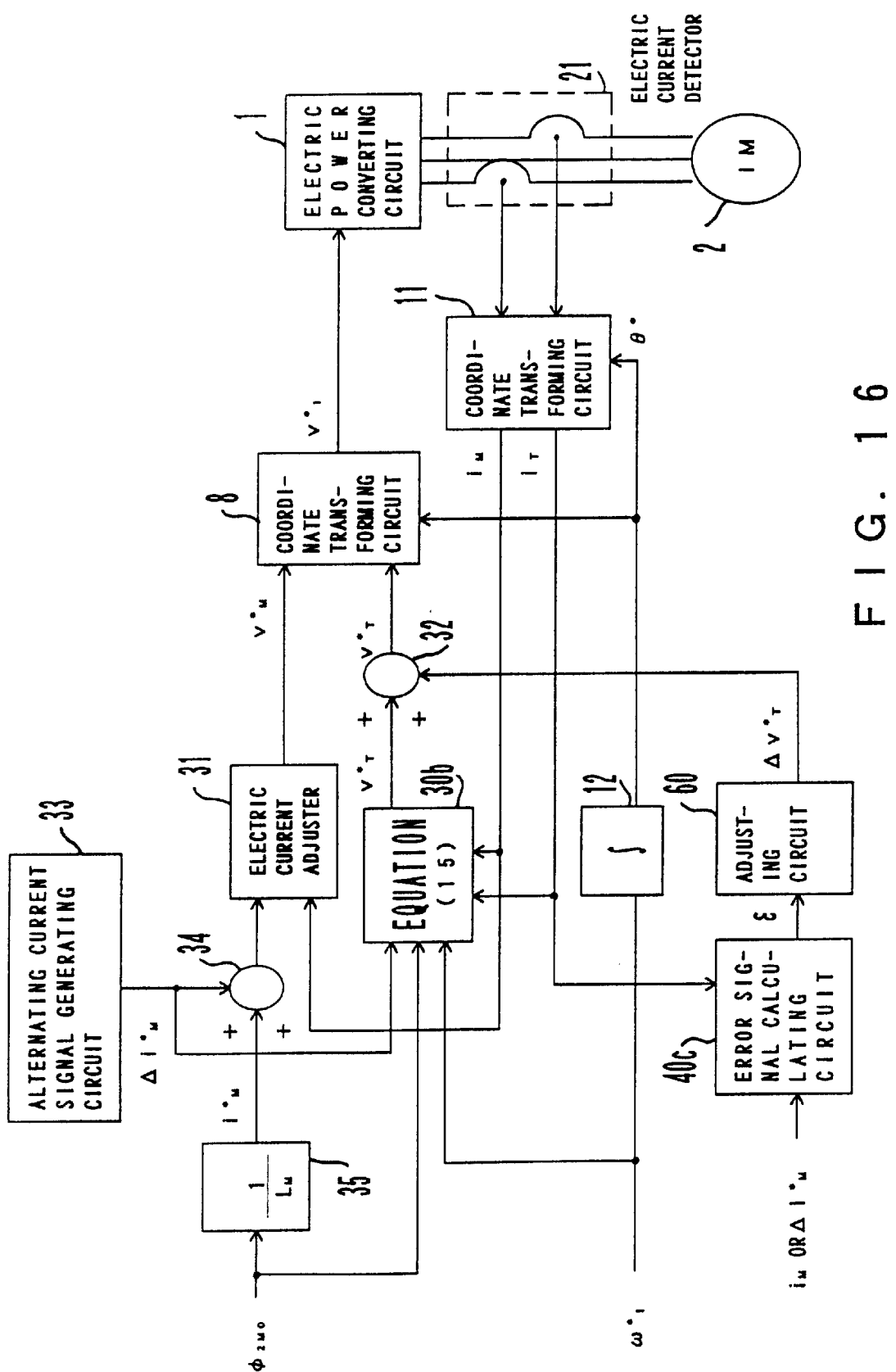
FIG. 16 is a block diagram showing the configuration of an eighth embodiment according to the present invention.

FIG. 16 is a block diagram showing the configuration of an eighth embodiment according to the present invention, which may correspond to claims 8 and 9.

In this embodiment, an adjusting circuit 60 which receives the error signal ε and outputs the T axis voltage correction value $\Delta v_T^*$, and an adder 32 which adds $\Delta v_T^*$ to $v_T^*$ are added to the seventh embodiment shown in FIG. 14 in order to correct the error.

According to the present invention, since a calculating unit for calculating an error signal which varies depending on a control error caused by a deviation of an operating point, and a correcting unit for correcting the control error using the error signal are arranged, the error signal can be easily obtained and superior control without control errors can be realized.

What is claimed is:

1. A variable speed controlling device for an induction motor, comprising:

supplying means for supplying a voltage or an electric current to the induction motor;

control means for controlling the voltage or the electric current supplied from the supplying means;

modulating means for generating a transient phenomenon in a magnetic flux of the induction motor; and extracting means for extracting a component depending on a slip frequency or a rotation speed of the induction motor from at least one of amounts of changes of a voltage, an electric current, and magnetic flux, which are caused by the transient phenomenon, wherein:

a manipulated variable of said control means is determined based on an output of said extracting means.

2. The variable speed controlling device for the induction motor according to claim 1, wherein:

said modulating means generates an alternating change in the magnetic flux on rotating coordinates which synchronizes with a rotating magnetic flux of the induction motor; and said extracting means extracts a component depending on a slip frequency of the induction motor from at least one of amounts of changes of a voltage, an electric current, and magnetic flux, which are generated in a direction orthogonal to a direction of the alternating change of the magnetic flux.

3. The variable speed controlling device for the induction motor according to claim 1, wherein:

said modulating means generates an alternating change in a magnetic flux on stator coordinates of the induction motor; and said extracting means extracts a component depending on a rotation speed of the induction motor from at least one of amounts of changes of a voltage, an electric current, and a magnetic flux, which are generated in a direction orthogonal to a direction of the alternating change of the magnetic flux.

4. The variable speed controlling device for the induction motor according to claim 1, wherein:

said manipulated variable of the operation of said control means is a magnitude or a phase of a voltage or an electric current supplied to the induction motor.

5. The variable speed controlling device for the induction motor according to claim 1, wherein:

said manipulated variable of said control means is a frequency of a voltage or an electric current supplied to the induction motor.

6. A variable speed controlling device for an induction motor driven via an electric power converting circuit, comprising:

a vector rotating device for resolving a primary current of the induction motor into a magnetizing current component in a direction of a magnetic flux axis (M axis) of the induction motor and a torque current component in a direction of an axis (T axis) orthogonal to the magnetic flux axis;

magnetic flux position calculating means for obtaining a position of the magnetic flux axis with an integration of a primary angular frequency so as to control at least torque of the motor by performing a predetermined control calculation based on the magnetizing current component and the torque current component and independently regulating a magnetizing current component and a torque current component of the motor;

an alternating current signal generating circuit;

an adder for adding an alternating current signal generated by the alternating current signal generating circuit to a command value of a magnetizing current;

a voltage detecting circuit for detecting a voltage of the induction motor;

an induced voltage calculating circuit for calculating an induced voltage from a detected voltage value and a detected electric current value; and an error signal calculating circuit for calculating an error signal generated according to a disaccord between a direction of an actual magnetic flux vector of the induction motor and a direction of a coordinate axis obtained by said magnetic flux position calculating means, based on the induced voltage and the magnetizing current or the alternating current signal.

7. A variable speed controlling device for an induction motor driven via an electric power converting circuit, comprising:

a vector rotating device for resolving a primary current of the induction motor into a magnetizing current component in a direction of a magnetic flux axis (M axis) of the induction motor and a torque current component in a direction of an axis (T axis) orthogonal to the magnetic flux axis;

magnetic flux position calculating means for obtaining a position of the magnetic flux axis with an integration of a primary angular frequency so as to control at least a torque of the motor by performing a predetermined control operation based on each of the components and independently regulating a magnetizing current component and a torque current component of the motor;

an alternating current signal generating circuit;

an adder for adding an alternating current signal generated by the alternating current signal generating circuit to a command value of a magnetizing current; and an error signal calculating circuit for calculating an error signal generated according to a disaccord between a direction of an actual magnetic flux vector of the induction motor and a direction of a coordinate axis obtained by said magnetic flux position calculating means, using a torque current and the magnetizing current or the alternating current signal.

8. A variable speed controlling device for an induction motor driven via an electric power converting circuit, comprising:

a vector rotating device for resolving a primary current of the induction motor into a magnetizing current component in a direction of a magnetic flux axis (M axis) of the induction motor and a torque current component in a direction of an axis (T axis) orthogonal to the magnetic flux axis;

magnetic flux position calculating means for obtaining a position of the magnetic flux axis with an integration of a primary angular frequency so as to control at least a torque of the motor by performing a predetermined control operation based on each of the components and independently regulating a magnetizing current component and a torque current component of the motor;

an alternating current signal generating circuit;

an adder for adding an alternating current signal generated by the alternating current signal generating circuit to a command value of a magnetizing current;

a calculating circuit for adding an amount of a voltage corresponding to a magnetic flux which varies depending on the alternating current signal to a voltage command value of the T axis; and an error signal calculating circuit for calculating an error signal generated according to a disaccord between a direction of an actual magnetic flux vector of the induction motor and a direction of a coordinate axis obtained by said magnetic flux position calculating means, using a torque current and the magnetizing current or the alternating current signal.

9. The variable speed controlling device for the induction motor according to one of claims 6 to 8, further comprising:

a regulating circuit for calculating a voltage correction value for correcting the T axis of the motor using the error signal calculated by said error signal calculating circuit; and another adder for adding the voltage correction value of the T axis to the voltage command value of the T axis, wherein:

the error signal resulting from the disaccord between the direction of the actual magnetic flux vector of the induction motor and the direction of the coordinate axis obtained by said magnetic flux position calculating means, is corrected.

10. The variable speed controlling device for the induction motor according to one of claims 1, 6, 7, and 8, wherein;

a frequency for modulating a magnetic flux may be set to be equal to or lower than a cut-off frequency of a secondary circuit of an induction motor.

\* \* \* \* \*